(12) United States Patent
Tudusciuc

(10) Patent No.: US 9,846,707 B2
(45) Date of Patent: Dec. 19, 2017

(54) METHOD FOR COLOR AND SIZE BASED PRE-FILTERING FOR VISUAL OBJECT SEARCHING OF DOCUMENTS

(71) Applicant: Bluebeam, Inc., Pasadena, CA (US)

(72) Inventor: Cristian Tudusciuc, Pasadena, CA (US)

(73) Assignee: Bluebeam, Inc., Pasadena, CA (US)

( * ) Notice: Subject to any disclaimer, the term of this patent is extended or adjusted under 35 U.S.C. 154(b) by 259 days.

(21) Appl. No.: 13/756,299

(22) Filed: Jan. 31, 2013

(65) Prior Publication Data

US 2014/0214864 A1 Jul. 31, 2014

(51) Int. Cl.
G06F 17/00 (2006.01)
G06F 17/30 (2006.01)
G06K 9/00 (2006.01)

(52) U.S. Cl.
CPC .... *G06F 17/3025* (2013.01); *G06F 17/30011* (2013.01); *G06F 17/30722* (2013.01); *G06K 9/00463* (2013.01)

(58) Field of Classification Search
CPC .... G06F 17/212; G06F 17/211; G06F 17/248; G06F 17/3025; G06F 17/30011; G06F 17/30722; G06K 9/00463; G06K 9/48; G06K 9/3241
USPC ........................................................ 715/243
See application file for complete search history.

(56) References Cited

U.S. PATENT DOCUMENTS

| 7,742,650 | B2 | 6/2010 | Xu et al. |
| 8,055,103 | B2 | 11/2011 | Fu et al. |
| 8,131,018 | B2* | 3/2012 | Wilson ........................... 382/104 |
| 8,433,133 | B2* | 4/2013 | Guerzhoy et al. ............ 382/164 |
| 2004/0071346 | A1* | 4/2004 | Clark ........................ G06K 9/48 382/209 |
| 2004/0146198 | A1* | 7/2004 | Herley .......................... 382/173 |

(Continued)

FOREIGN PATENT DOCUMENTS

WO WO 2011 154166 A1 12/2011

OTHER PUBLICATIONS

Thomas, Shane, PCT Notification of Transmittal of the International Search Report and Written Opinion of the International Searching Authority, or the Declaration, dated May 8, 2014 pp. 1-11.

(Continued)

*Primary Examiner* — Scott Baderman
*Assistant Examiner* — Jason Edwards
(74) *Attorney, Agent, or Firm* — Stetina Brunda Garred and Brucker

(57) ABSTRACT

A method for pre-filtering visual objects on a document is disclosed. A selection of a template visual object with constituent components from a subsection of the document is received. Then, a feature set is derived, including a color list of colors defining the object components, a bounding definition of the object components, and an ancillary raster component intersection flag. A subset of pre-filtered visual objects is generated from the visual objects on the document. These match a predefined criteria based on the color list, live bounding definition, or the ancillary raster component intersection flag. A pre-filtered document raster image is then generated from the document, where the pixels corresponding to the pre-filtered visual objects are included.

20 Claims, 12 Drawing Sheets

(56) References Cited

U.S. PATENT DOCUMENTS

| | | |
|---|---|---|
| 2005/0089223 A1* | 4/2005 | Krumm .............. G06K 9/00228 382/170 |
| 2005/0227217 A1* | 10/2005 | Wilson .......................... 434/337 |
| 2007/0300143 A1 | 12/2007 | Vanderport et al. |
| 2008/0082426 A1* | 4/2008 | Gokturk et al. ................ 705/27 |
| 2008/0239354 A1 | 10/2008 | Usui |
| 2009/0060330 A1 | 3/2009 | Liu |
| 2009/0112861 A1 | 4/2009 | Saugen et al. |
| 2009/0216794 A1* | 8/2009 | Saptharishi ....... G06F 17/30274 |
| 2010/0061634 A1 | 3/2010 | Howie |
| 2011/0078552 A1 | 3/2011 | Lumley et al. |
| 2012/0051649 A1 | 3/2012 | Saund |
| 2012/0263388 A1 | 10/2012 | Vaddadi et al. |

OTHER PUBLICATIONS

European Patent Office, European Search Report and Opinion for Application No. 138735691, dated Sep. 23, 2016, 8 pages.

\* cited by examiner

METHOD FOR COLOR AND SIZE BASED PRE-FILTERING FOR VISUAL OBJECT SEARCHING OF DOCUMENTS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure generally relates to computerized searching, and more particularly, to methods for color and size based pre-filtering for visual object searching of documents.

2. Related Art

The creation, distribution, and management of information axe core functions of business. Information, or content can be presented in a variety of different ways, including word processing documents, spreadsheets, graphics, photographs, engineering drawings, architectural plans, and so forth, in electronic form, these are generally referred to as documents, and may be generated and manipulated by computer software applications that are specific thereto. A typical workflow in the enterprise involves various personnel oftentimes across disparate geographic locations, collaborating to create, review, and/or edit such documents.

Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a pap description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the international Organization for Standardization (ISO) as ISO/SEC 3200-1:2008. Currently, PDF is utilized to encode a wide variety of document types, including those composed largely of text, and those composed largely of vector and raster graphics. Due to its versatility and universality, files in the PDF format are often preferred over more particularized file formats of specific applications. As such, documents are frequently converted to the PDF format.

One of the significant advantages of working with electronic documents such as those in the PDF format is the ability to search a large volume of information in a short period of time. With non-electronic or paper documents, searching for an item of information, even with the best of cataloging and other indexing tools, proved to be an arduous and painstaking process. In general, the searching of conventional electronic documents has been limited to text-based methods, where the user enters a simple word query and the locations where that queried word or words are found are identified. Additional search parameters such as formatting can also be specified. Boolean and natural language searching techniques are also known, though typically utilized for searching across databases of documents, web pages on the World Wide Web, and so forth. Ultimately, however, these involve text-based queries.

The information/subject matter stored in and exchanged as PDF files is becoming more complex, and a wide range of documents are being digitized as part of the trend toward paperless offices. Indeed, engineering diagrams, construction plans, wiring diagrams, and so forth are oftentimes saved in, and shared via, PDF documents. With the increasing use of graphics in documents, particularly in those types listed above, querying for such elements is a desirable feature. For example, construction drawings contain various symbols that variously provide pertinent reference information to the viewer not immediately apparent from the drawings, link to other parts of the drawing or the document, and so forth. Such links associated with the symbols may be made active, or a count of a particular symbol may be necessary. Presently, this is performed manually, which is extremely time-consuming.

Rather than searching the contents of the graphics itself another conventional technique involves associating metadata with the graphic and using a text-based, search thereof. A variety of information can be specified hi the metadata, such as subject matter or content keywords, category keywords, location keywords, and so forth. In a catalog of different images or graphics, such text metadata searching may be adequate. But cataloging every graphic in a large document may not be possible, particularly if the document data structure is not accommodating thereof.

When human beings search for occurrences of specific graphical information on a document, a description based on the set of features of that graphic is intuitively formulated. These features are typically the size, shape, and color of the object, as well as the relationship between such object and the other graphics contained within a document. That description of features, which is generally referred to as a template, is compared against different segments of the document to identify match candidates. There are significant challenges associated with implementing such seemingly intuitive but complex mental processes as discrete steps that can be executed by a data processor. Various techniques and algorithms have been developed, but they tend to involve mathematically intensive operations on a large amount of data. A significant factor in improved accuracy and speed is therefore attributable to improvements in raw data processing capabilities.

One technique for visual searching is contemplated in co-pending U.S. patent application Ser. No. 13/018,299 entitled "A method for multiple pass symbol and components-based visual object searching for documents," also assigned to the present assignee and the entirety of the disclosure of which is hereby wholly incorporated by reference herein. This involves the selection and definition of a raster template for which the document is searched. Raster image representations of the document are generated, and match candidates are generated and narrowed at successively detailed levels.

The human mind can fill in certain omitted or obstructed details, so it is possible to identify graphic elements even when partially hidden. However, in some use cases of the aforementioned raster image based searching, these partially bidden graphic elements may not be identified. In the architecture, engineering, and construction industries, the typical PDF document generated may contain several overlapping layers of information. Furthermore, these industries tend to involve highly collaborative workflow processes where multiple users comment and place various annotations on the document. A search of a rasterized image of the document may not successfully identify obstructed such content. Additionally, these complex documents tend to yield data-intensive raster images that tend to slow down the aforementioned visual search modality.

Accordingly, there is a need in the art for methods of color and size based pre-filtering for visual object searching of documents with improved speed and accuracy.

BRIEF SUMMARY

In accordance with various embodiments, a method of pre-filtering visual objects on a document, for computerized searching thereof is disclosed. The preprocessing operation is envisioned to substantially improve search speeds and result quality since the data set for a subsequent raster-based visual search is reduced, particularly where the document is comprised of vector components. Furthermore, accurate identification of matches is possible even with complex documents with numerous overlays.

A first embodiment of the method may include receiving a selection of a template visual object from a subsection of the document. The template visual object may be defined by one or more object components. Additionally, there may be a step of deriving a feature set of the template visual object. The feature set may include at least one of a color list of colors defining the object components, a bounding definition of the object components, and an ancillary raster component intersection flag. Notwithstanding the enumeration of all of these making up the feature set, various embodiments may have only one. The method may further include generating a subset of pre-filtered visual objects from the visual objects on the document. The pre-filtered visual objects may match at least one of a predefined criteria based on at least one of the color list, the bounding definition, and the ancillary raster component intersection flag of the feature set. Again, different embodiments contemplate the possibility of only one of these being the basis of the predefined criteria. There may also be a step of generating a pre-filtered document raster image from the document. The pre-filtered document raster image may include pixel sets of one or more connected sequences of adjacent pixels. The pixel sets, in turn, may correspond to the subset of the pre-filtered visual objects.

A second embodiment of the present disclosure also contemplates a method of pre-filtering visual objects on a document for computerized searching thereof. The method may include receiving a selection of a template visual object area from a subsection of the document. The template visual object area may be defined by one or more sequences of connected pixels, and each may have a color value. The method may continue with generating a histogram of the color value from each of the pixels within the template visual object area. Additionally, there may be a step of generating a pre-filtered document raster image from the document. The pre-filtered document raster image may include pixel sets of one or more connected sequences of adjacent pixels. Furthermore, the pixels in the pre-filtered document raster image may be within a predefined range of a peak of the color value. It is understood that more than one peak may be specified.

The aforementioned methods may be implemented as a series of steps executable by a data processing apparatus and embodied in non-transitory program storage medium. The presently contemplated embodiments will be best understood by reference to the following derailed description when read in conjunction with the accompanying drawings.

BRIEF DESCRIPTION OF THE DRAWINGS

These and other features and advantages of the various embodiments disclosed herein will be better understood with respect to the following description and drawings, in which.

DETAILED DESCRIPTION

The detailed description set forth below in connection with the appended drawings is intended as a description of the presently preferred embodiment of the computerized searching pre-filtering method, and is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
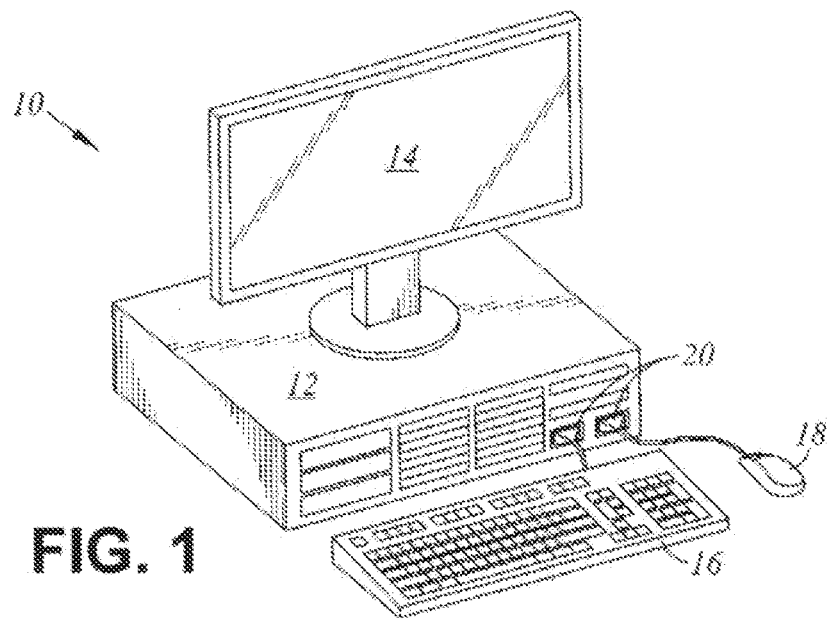
FIG. 1 is an exemplary computer system that may be capable to perform functions for use with aspects of the present invention including a display device.

FIG. 1 depicts an exemplary hardware environment in which various aspects of the contemplated method of document management and arrangement may be implemented. Generally, there is a computer system 10 with a system unit 12 and a display device 14. The display device 14 produced a graphical output from the data processing operations performed by the system unit 12. Input devices including a keyboard 16 and a mouse 18, for example, may be manipulated by a user to generate corresponding inputs to the data processing operations, and are connected to the system unit 12 via ports 20. Various other input and output devices may be connected to the system unit 12, and different interconnection modalities are known in the art.

Figure 2:
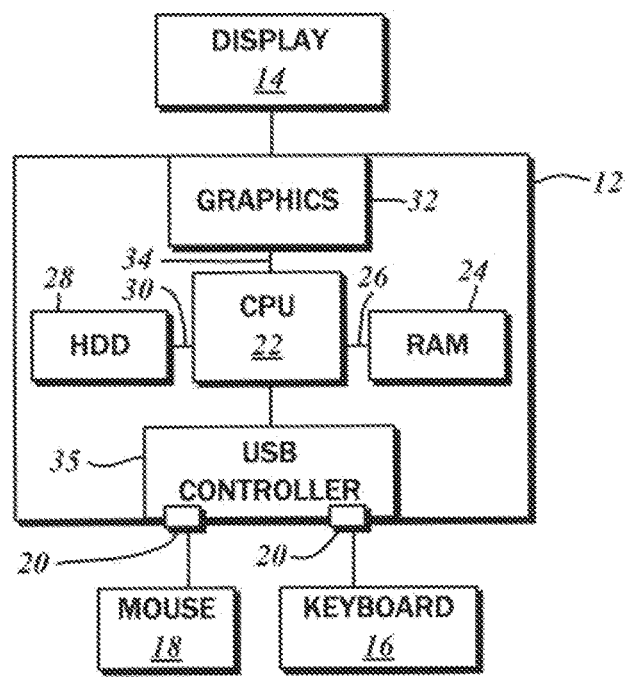
FIG. 2 is a block, diagram of system components of the exemplary computer system of FIG. 1.

As shown in the block diagram of FIG. 2, the system unit 12 includes a processor (CPU) 22, which may be any conventional type. A system memory (RAM) 24 temporarily stores results of the data processing operations performed by the CPU 22, and is interconnected thereto typically via a dedicated memory channel 26. The system unit 12 may also include permanent storage devices such as a hard drive 28, which is also in communication with the CPU 22 over an input/output (I/O) bus 30. A graphics module 32 may also connected to the CPU 22 via a video bus 34, and transmits signals representative of display data to the display device 14. As indicated above, the keyboard 16 and the mouse 18 are connected to the system unit 12 over the port 20. In the embodiments where the post 20 is a USB type, there may be a USB controller 36 that translates data and instructions to and from the CPU 22 for the external peripherals connected via the port 20. Additional devices such as printers, microphones, speakers, and the like may be connected to the system unit 12 thereby.

According to one embodiment, a user can internet with the computer system 10, and specifically with the graphics being generated en the display device 14, via the mouse 18. The movement of a cursor generated on the display device 14 is tied to the movement of the mouse 18, with further interactivity being provided with input from the mouse buttons. Input from the keyboard 16 also provides interactivity with the computer system 10. Although certain features of the present disclosure are described in relation to a computer system with such input and output capabilities, specifics thereof are presented by way of example only and not of limitation. For example, the following description refers to "clicking" the mouse buttons, "positioning" the cursor, "holding" the mouse button to "drag" an on-screen, object, and so forth. Such terms have well-understood meanings relative to interactions with the example user interfaces set forth herein. However, any alternative graphical user interfaces such as touch interfaces and pen/digitizer interfaces may be substituted. The analogs of those features will be readily appreciated, along with suitable modifications to accommodate these alternative interfaces while still achieving the same functionalities.

Along these lines, the foregoing computer system 10 represents only one exemplary apparatus of many otherwise suitable for implementing aspects of the present disclosure, and only the most basic of the components thereof have been described. It is to be understood that the computer system 10 may include additional components not described herein, and may have different configurations and architectures. Any such alternative is deemed to be within the scope of the present disclosure.

Figure 3:
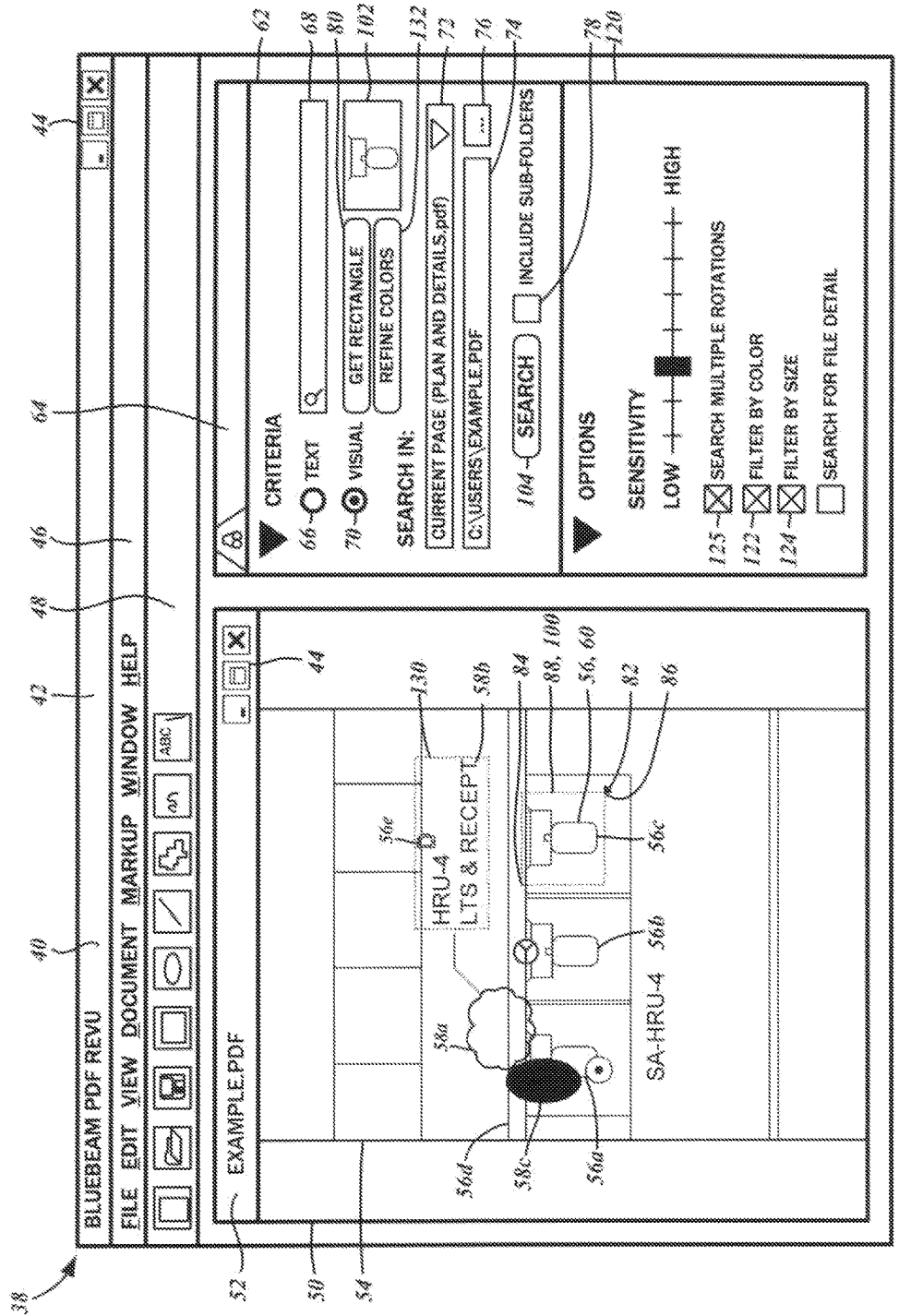
FIG. 3 is an exemplary user interface of a document reviewing software application that implements various aspects of the contemplated method of pre-filtering visual objects.

Referring now to FIG. 3, there is shown an exemplary graphical user interface 38 of a document editing software application in which various embodiments of the method of pre-filtering may be implemented. As utilized herein, the term document refers to an electronic file or standalone representation of data that can be opened, rendered and/or edited by the corresponding document reviewing software application. Accordingly, the document may be formatted and structured in a particular way so that its elements can be rendered consistently. In the exemplary embodiment discussed herein, the document reviewing software application handles PDF documents, and the following description of the computerizing searching method will be in relation thereto. However, it will be appreciated by those having ordinary skill in the art that documents in any other format that, are editable with any other software application may be substituted. The software application runs on a windowing system, and accordingly has a number of interface elements that are common to applications for the same.

The functional interactive features of the graphical user interface 38 are contained within a main window 40 that includes a title bar 42 with basic window controls 44 that variously minimize, maximize, and close the main window 40. In addition, the main window 40 includes a menu bar 46, from which various functions of the document editing software application may be invoked via pull-down menus. So that commonly utilized functions such as opening files, saving changes to the currently opened file, and so forth are readily accessible, there is also a tool bar 48. Within the main window 40 is a workspace window 50, which includes a sub-title bar 52 with the name of the opened document file, "example.pdf" and the basic window controls 44.

There is a document 54 that is rendered within the workspace window 50. In the example shown, the document 54 is an architectural drawing comprised of various graphic elements 56. As part, of the drawing, or appended to the document 54, them may be several overlaid annotation objects 58. In particular, there is a first annotation 58a, a second annotation 58b, and a third annotation 58c, among others. By way of example, the first annotation 58a is understood to be a callout cloud that draws attention to the graphic element 56 enclosed thereby. The second annotation 58b may be a text comment that has been added as a further explanation of the first annotation 58a. The third annotation 58c partially obstructs the underlying graphic element 50.

The graphic elements 56 and the annotations 58 alike may be referenced generally as visual objects 60 of the document 54. Each visual object 60 is understood to have associated position values that correspond to the specific locations within the document 54 in which they are placed. The position values may be relative to coordinates that are referenced to the document 54. Furthermore, the visual object 60 may be defined in terms of vector components with start and end point coordinates, as well as a raster bitmap, i.e., a set of pixel values. Various embodiments of the present disclosure contemplate the pre-filtering of certain visual objects 60 for improved searching. It will be recognized that the specific appearance and content of the visual objects 60 are presented by way of example only, and there are numerous other types of visual objects 60 that may be included on the document 54.

The main window 40 also includes a tool panel window 62 that is positioned to the right of the workspace window 50. A search function is contemplated in accordance with one embodiment of the present disclosure, and so the tool panel window 62 has a tab 64 specific thereto, as indicated by an icon depicting a pair of binoculars. Other functions may be accessible via different tabs, but for the sake of brevity, such other tabs are not shown. As with conventional document reviewing software applications, a text-based search is possible. Selecting a first radio button 66 activates such text-based searching features, and the text for which the document 54 is searched is entered into a text box 68. Selecting a second, radio button 70 invokes a visual object-based search as will be described in further detail below.

With the selection of either the first radio button 66 (text-based search) or the second radio button 70 (visual, object-based search), additional search parameters may be specified. A first pull-down menu 72 allows a selection of the document(s) 54 to search. FIG. 3 illustrates this parameter as being set to the current document, which limits the search to the document currently being reviewed in the workspace window 50. It is contemplated that multiple documents can be opened in the software application at once, so another setting of this parameter can be set to all open documents.

Beyond the isles opened in the software application, there is also an option to search for multiple documents stored in the file system. In the first pulldown menu 72, this option may be referenced as "folder." The top-level directory that is to be searched is specified in path entry text box 74. As implemented in other graphical user interfaces, there is a file system browser button 76 that invokes a dialog box for visually navigating the file system. A checkbox 78 specifies whether sub-directories of the selected top-level directory that is to be searched. The path entry text box 74 and the checkbox 78 are understood to be active when the option to search for multiple documents is selected, that is, when the first pull-down meets 72 is set to "Folder A." At other times, the path entry text box 74, the file system browser button 76, the checkbox 78, and its associated descriptive text may be dimmed and rendered inactive.

Although the methods of pre-filtering refer to searching one document, it is understood that the method is applicable to multiple documents as well. Such multiple document pre-filtering and subsequent searching can be invoked by setting the parameters therefor as described above.

Figure 4:
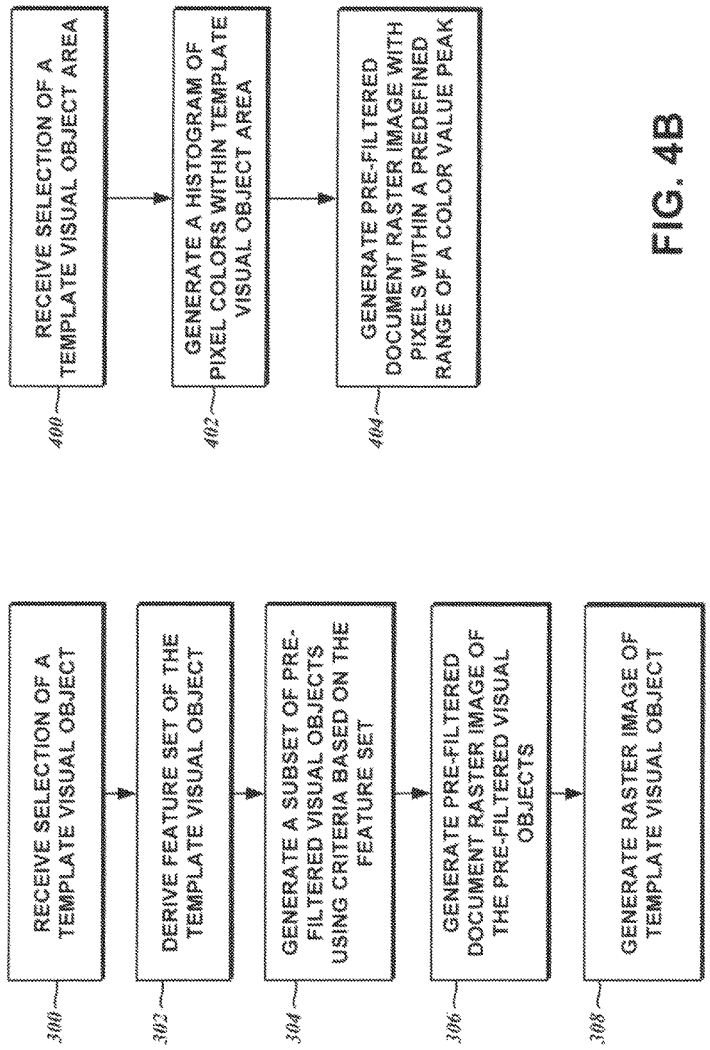
FIG. 4A is a flowchart illustrating a first embodiment of a method for pre-filtering visual objects on a document in which a template visual object and a document visual object contains vector data.
FIG. 4B is a flowchart illustrating a second embodiment the method for pre-filtering visual objects on the document in which bitmap data of a template visual object area is used.

Among other objectives, the present disclosure contemplates pre-filtering of visual objects on the document 54 to minimize extraneous data on which the visual search will operate, and to be able to identify partially or completely obstructed visual document prior to a rasterization step attendant to such visual search. As mentioned above, the PDF standard accommodates the storage and presentation of the content of the document 54, i.e., the visual objects 60, as sets of vector data defining its characteristics, including object type, color, coordinate values of connected components of the object, and so forth. A first embodiment of the pre-filtering method involves such vector data, and the steps thereof are shown in the flowchart of FIG. 4A. Alternatively, the PDF standard also accommodates the storage of the visual objects 60, and indeed, the entire document 54, as a raster or a bitmap defined by a multi-dimensional array of pixels each having a color value. Another, second embodiment of the pre-filtering method involves such raster data, and the steps thereof are shown in the flowchart of FIG. 4B. Both of these embodiments will be discussed in order.

Both embodiments contemplate a step of capturing a template of the visual object. As shown in the flowchart of FIG. 4A, the first embodiment of the pre-filtering method involving the vector data contemplates a step 300 of receiving a selection of a template visual object. Similarly, as shown in the flowchart of FIG. 4B, the second embodiment of the pre-filtering method involving the raster data Includes a step 400 of receiving a selection of a template visual object area.

Utilizing the document reviewing application shown in FIG. 3, in both cases this may include activating a select button 80 in the tool panel window 62. Next, a cursor 82 may be dragged from a first position 84 to a second position 86, thereby defining a selection area 88 that encompasses the visual object 60, that is, the graphic element 56 depicting a toilet. While a specific technique in which the template visual object 90 is selected has been described, it will be recognized that there are other techniques involving different interfaces may be substituted without departing from the scope of the present disclosure.

Figure 5:
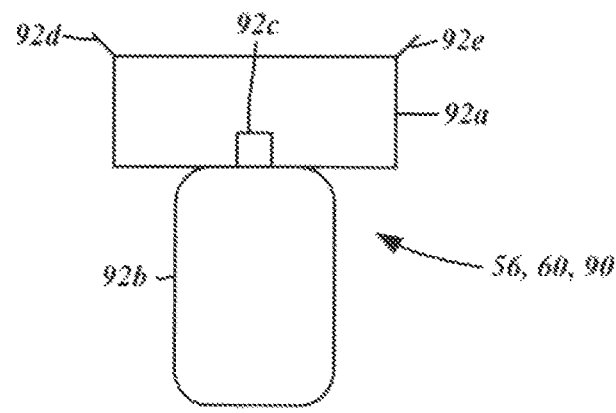
FIG. 5 is a vector graphic representation of an example template visual object.
Figure 6:
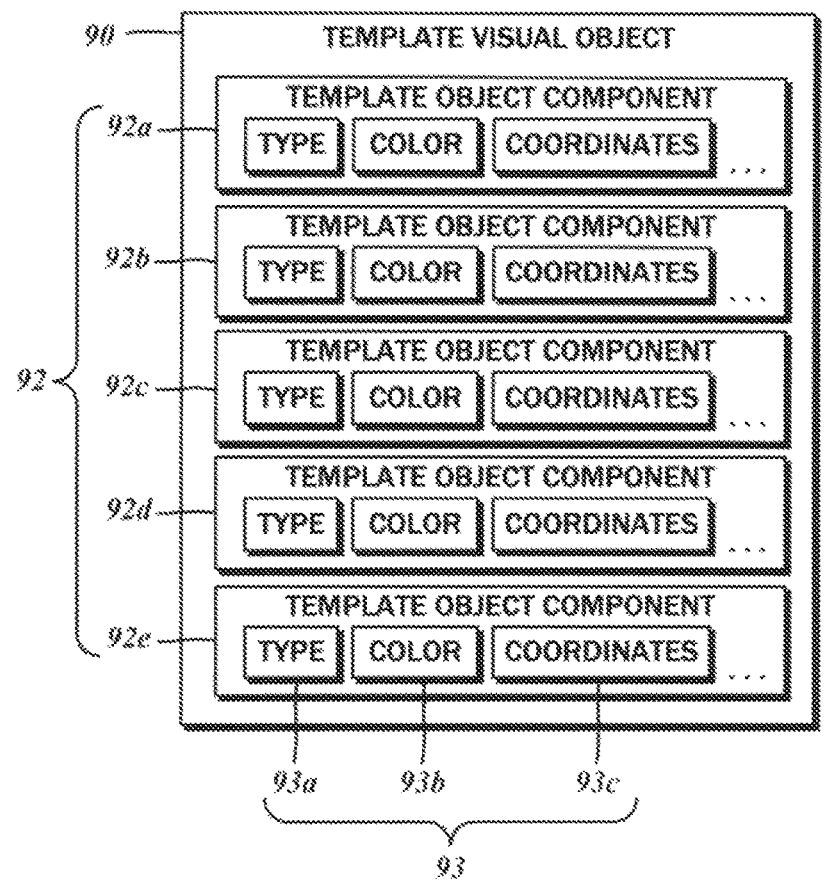
FIG. 6 is a data, structure diagram of the vector graphic representation shown in FIG. 5.

In the first embodiment of the pre-filtering method, this selected visual object 60 will also be referred to as a template visual object 90. With reference to FIG. 5 this graphic element 56 can be represented as a series of specifically sized, positioned and colored (among other attributes) geometric primitives or object components 92 that are mathematically defined. In the illustrated example, there is a first rectangle 92a, a second rectangle 92b, a square 92c, a first diagonal line 92d, and a second diagonal line 92e. These constructions are presented by way of example only, and any other suitable definition, such as a series of straight lines and curves may also be utilized. As shown In the data structure diagram of FIG. 6, each object component 92 is defined by one or more attributes 93, including an object type attribute 93a, a color attribute 93b, and a coordinates attribute 93c. Each of these attributes 93 and more define the visual appearance and positioning of the corresponding object component 92, which when combined, defines the visual appearance and positioning of the template visual object 90. Thus, the selection of the visual object 60 in accordance with the step 300 is understood to place the various attributes 93 of each object component 92 into a temporary storage.

Figure 7:
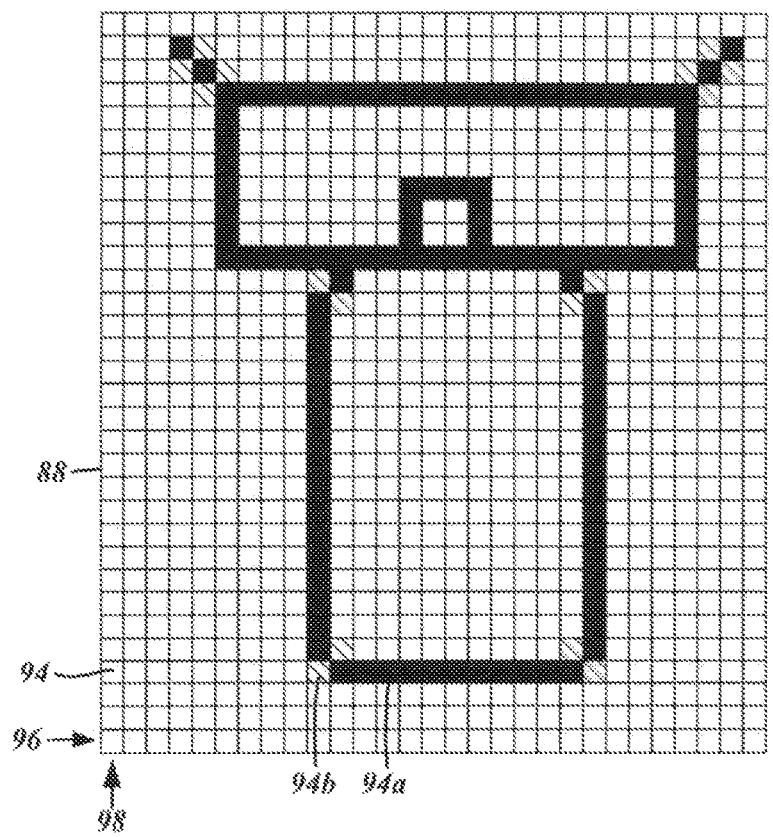
FIG. 7 is an equivalent simplified raster graphic representation of the example template visual object shown In FIG. 5.

The same aforementioned interaction in the second embodiment of the pre-filtering method, on the other hand, is understood to select an area of the document 54 that is a subsection thereof. FIG. 7 illustrates a raster representation of the aforementioned selection area 88. The entirety of the document 54, or at least the pertinent part thereof, is defined by a multidimensional array of pixels 94 arranged in a plurality of rows 96 and a plurality of columns 98. The selection area 88, and hence the template visual object area 100, contains the pixels 94 that make up the graphic element 56. Each pixel 94 is understood to have a variable color or pixel intensify value. Those pixels 94 of similar intensities and adjacent to each other may be grouped into a connected sequence. As referenced herein, a first pixel is connected to a second pixel if the two are immediately adjacent, or at least adjacent within a predetermined distance in the upward, downward, leftward, or rightward relation, and has a difference in respective intensities that is below a predetermined threshold. Accordingly, a chain or sequence of connected pixels may be defined. For any given template visual object 90, there may be a set of one or more connected sequences of adjacent pixels. The step 400 of receiving the selection of the template visual object area 100 therefore involves copying each of the pixel intensity and coordinate values within into the temporary storage.

Whether the vector form or the raster form is designated as the template, a template preview 102 in the tool panel window 62 is updated. The template preview 102 is understood to be a representation of either the template visual object 90 or the template visual object area 100 that was selected previously in steps 300 or 400. In this regard, prior to commencing the pre-filtering and/or the search, the parameters thereof can be viewed.

Figure 8:
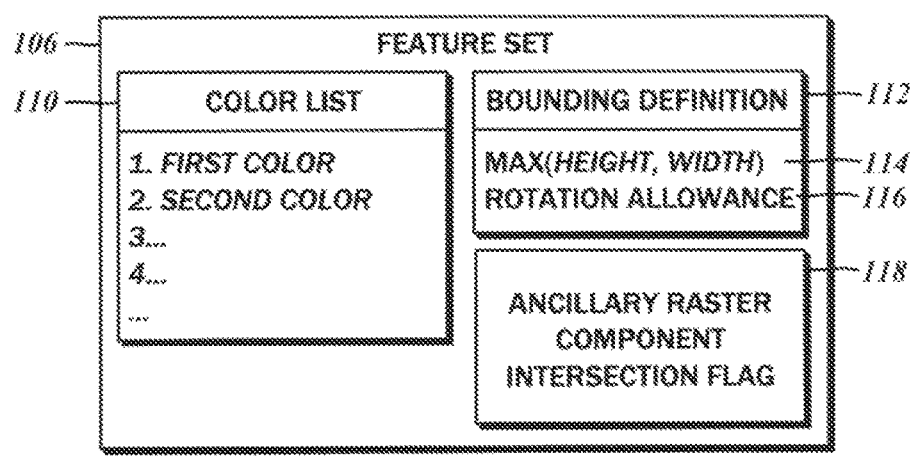
FIG. 8 is a data structure diagram of a feature set in accordance with, various embodiments of the present disclosure.

The method of pre-filtering visual objects may continue upon activating a search button 104 in the tool panel window 62. With reference to the flowchart of FIG. 4A, the first embodiment of the method continues with a step 302 of deriving a feature set of the template visual object 90. As best shown in the data structure diagram of FIG. 8, the feature set 106 may include a color list 110 including the color attributes 93b of each of the template object components 92 in the template visual object 90. For example, if the graphic element 56 was comprised of black and grey template object components 92, then black and grey would be listed in the color list 110. As will be described in further detail below, one of the objectives of pre-filtering is to eliminate any visual objects 60 that are not like the template visual object 90, so only those visual objects with a color attribute listed in the color list 110 may be a candidate for retention.

The feature set 106 may also include a bounding definition 112 that is related to the size of the template visual object 90. An exact numeric value can be calculated from the coordinate values 93e of each of the template object components 92 in the template visual object 90. In further detail, the bounding definition 112 sets a maximum length 114 that is the maximum of all heights and widths of the bounds. In order to accommodate potentially rotated visual objects 60 on the document 54, the maximum length may be multiplied by a rotation allowance factor 116. Preferably, though optionally, the rotation allowance factor 116 is 1.5. It is understood that the bounding definition 112 need not be commensurate with the inputted selection area 88, as the size of the template visual object 90 therein may be smaller. Again, one of the objectives of pre-filtering is the elimination of any visual object 60 that is dissimilar to the template visual object 90, and only those that have a size equal to or smaller than that defined by the hounding definition 112 is retained.

Another possible part of the feature set 106 is an ancillary raster component intersection flag 118. This is understood to determine if there is any raster or bitmap component that intersects the template visual object 90 as selected. A "bitmap like" data refers to any other visual object 60 that is defined as a bitmap, i.e., an array of individual pixels, or annotations that include such bitmaps.

Figure 9:
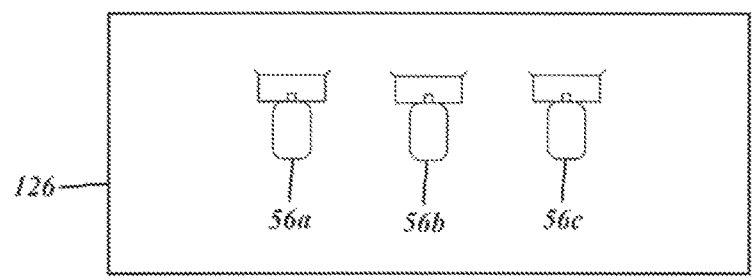
FIG. 9 is an example pre-filtered document raster image.

With reference back to the flowchart of FIG. 4A and the block diagram of FIG. 9, once the feature set 106 has been derived, the method may continue with a step 304 of generating a subset of pre-filtered visual objects from the visual objects 60 on the document 54. This is generated using predefined criteria that are based on one or more of the aforementioned parts of the feature set 106. As indicated above, one of these criteria is the color of any visual objects 60 matching that of the template visual object 90 as set forth in the associated color list 110. This criterion may also be referred to as filtering by color. Another criterion is the size/length of any visual objects 60 being less than or equal to the maximum length specified in the bounding definition 112, where the length of any visual object 60 is defined as the maximum between the height and width thereof. This criterion may also be referred to as filtering by size. Yet another criterion is the existence of bitmap-like information overlaid on the visual object 60.

It is possible for the user to select which one or more of the filter criteria to apply, and any one or more can be selected in accordance with embodiments of the present disclosure. In other words, the pre-filtered visual objects may match the template visual object 90 only with respect to color, only with respect to size, only with respect to the ancillary raster component intersection flag 118, or with respect to any combination of the foregoing.

As best illustrated in FIG. 3, such the selection is possible via an options subpanel 120 of the tool panel window 62. There is a color checkbox 122 to filter by color, and there is a size checkbox 124 to filter by size, both in accordance with the derived feature sets of the color list 110 and the bounding definition 112 described above. If is understood that in this embodiment, the option to select or deselect filtering based on the ancillary raster component intersection flag is not present, as this is largely based on the characteristics of the initially designated selection area 88. The color checkbox 122 is set by default, as is the size checkbox 124.

Because the selection of the checkboxes 122, 124 are made before invoking step 302 by activating the search button 104, it is possible for the pre-filtering method to derive only those parts of the feature set 106 that are used for generating the subset of the pre-filtered visual objects. For example, if only the color checkbox 122 is selected, it may not be necessary to derive the bounding definition 112 since. It will not be part of the size filter criteria. However, it will be recognized by those having ordinary skill in the art that the aforementioned step 302 may include deriving each part of the feature set 106 regardless of which filter criteria is set, with that selection being pertinent upon reaching the subsequent steps in which raster images are generated.

The method continues with a step 306 of generating a pre-filtered document raster image of the subset of pre-filtered visual objects that meet the predefined criteria set forth above. The raster image includes pixel sets of one or more connected sequences of adjacent pixels, and these pixel sets are understood to correspond to those pre-filtered visual objects 60 that meet the indicated criteria. Thus, the presently contemplated pre-filtering method rasterizes only those visual objects 60 that have similar characteristics as the selected template visual object 90. All other pixels that do not correspond to the pre-filtered visual objects 60 are removed, not rasterized in the first place or otherwise not present on the resultant pre-filtered document raster image. This is understood to reduce the data set on which a subsequent raster image-based visual search method operates.

According to another aspect of the pre-filtering method, the above-described step of generating the pre-filtered document raster image may further include a dilation operation. Preferably, though optionally, the dilation utilizes a 3×3 operator. Those having ordinary skill in the art will recognize that dilation is a basic morphological operation that expands the outline of the visual objects 60 subject thereto. Thus, it is not necessary to rasterize the visual objects 60 multiple times with slightly different offsets to account for variances. Moreover, errors resulting from anti-aliasing can be reduced. As indicated above, one of the objectives of the pre-filtering method is to generate a document raster image for visual searching. The template visual object 90 is also rasterized for this purpose, and therefore the same dilation operation can be applied Thereto.

Generally, the visual searching method involves generating a match candidate subset of the visual objects 60 on the document 54, and more particularly, the pre-filtered document raster image with only the pre-filtered visual objects remaining thereon. This may be based upon a comparison of the rasterized template visual object 90 to the pre-filtered document raster image. In this regard, the pre-filtering method may also include a step 308 of generating a raster image of the template visual object. This step may occur before or alter generating the pre-filtered document raster image, though in either case, at some point after the selection of the template visual object 90 is received in the step 300. While the all of the steps of the various embodiments of the pre-filtering method have been described according to a prescribed order, this is by way of example only and not of limitation. Those having ordinary skill in the art will recognize that the different steps can be ordered in different ways, while accounting for order when the particulars of one step depend on data or other elements from another step.

To further improve the accuracy of the visual search, multiple versions of the template visual object 90 can be rasterized, in which each version has a slight angular offset. In one embodiment, the angular offset may be incremented by 45 degrees, so that there are different versions of the template visual object 90 at 45 degrees, 90 degrees, 135 degrees, 180 degrees, 225 degrees, 270 degrees, and 315 degrees. Additionally, a mirroring operation as well as a flip operation may be applied to the template visual object 90. This feature is understood to detect rotated visual objects 60 on the document 54. Due to the increased computational demands that this process imposes, it is an option that may be activated and deactivated via a search multiple rotations checkbox 125.

Continuing with the example document 54 shown in FIG. 3, there are three instances of the graphic element 56a-56c depicting toilets thereon, each of which may be colored black. There may be other visual objects 60 such as a line graphic element 56d that is colored blue. As shown in FIG. 9, when the selection of the template visual object 90 is the toilet graphic element 56 without any bitmap like overlays, all three instances of the graphic element 56a-56c are part of the pre-filtered visual objects 60 and is therefore rasterized in a pre-filtered document raster image 126. Because the feature set 106 derived from the template visual object 90 indicates a color of black per the example, any other elements such as the aforementioned blue line graphic element 56d are not present. Furthermore, the bounding definition 112 is also of the template visual object 90, any others larger visual objects 60 have likewise been omitted. The opaque markup otherwise overlaid on the first instance of the graphic element 56a is also absent because the ancillary raster component intersection flag 118 in the feature set 106 is not set.

Figure 10A:
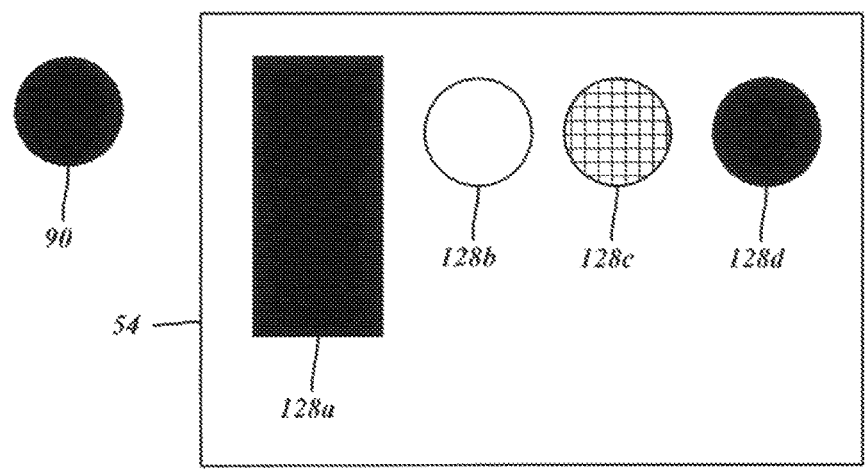
FIG. 10A-10B show pre/post-execution examples of die pre-filtering method based on color.
Figure 10B:
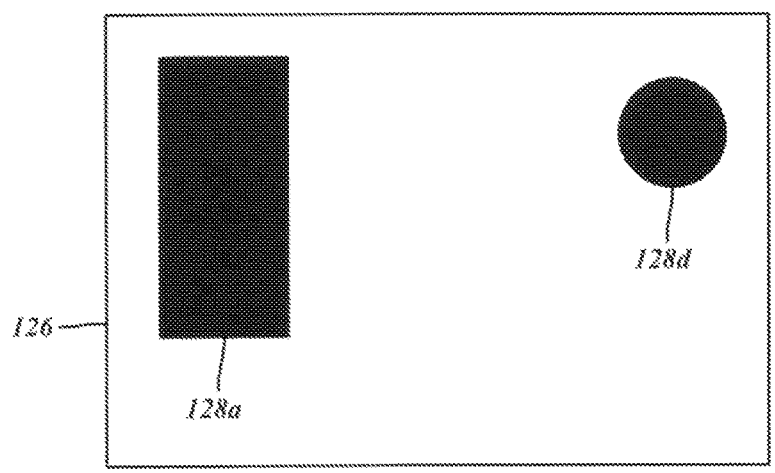

Another, more simplified example is shown in FIGS. 10A and 10B to illustrate the color filtering feature. There is a first rectangular graphic element 128a colored black, a second circular graphic element 128b colored white, a third circular graphic element 128c colored an intermediate color that is neither white nor black, and a fourth circular graphic element 128d colored black. With the template visual object 90 that has a circular shape and a black color, an application of the pre-filtering method on the basis of color only yields the pre-filtered document raster image 126 shown in FIG. 10B. As shown, only the first rectangular graphic element 128a and the fourth circular graphic element 128d remain, as these are the only ones that are defined by the color black. The color-only criterion is useful when the visual object 60 being queried is a subpart of a larger object.

Figure 11A:
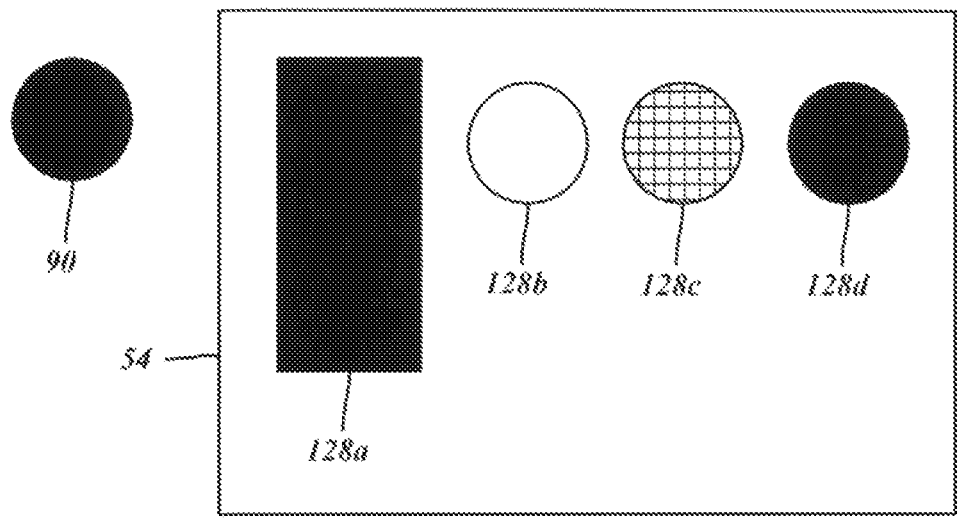
FIG. 11A-11B show pre/post-execution examples of the pre-filtering method based on size.
Figure 11B:
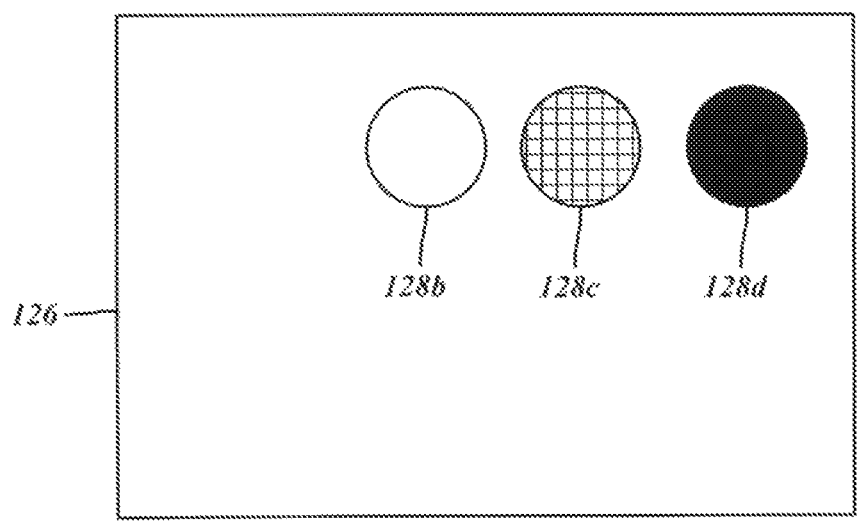

The simplified example of FIG. 11A-11B similar to that of FIG. 10A-10B will be referenced to demonstrate the size filtering feature. Again, there is a first rectangular graphic element 128a colored black, a second circular graphic element 128b colored white, a third circular graphic element 128c colored an intermediate color that Is neither white nor black, and a fourth circular graphic element 128d colored black. Furthermore, the template visual object 90 has a circular shape and a black color. The resultant pre-filtered document raster image 126 following the execution of the method of pre-filtering is shown in FIG. 11B, with only the similarly sized circular graphic elements 128b-128d, regardless of the color. This size-only criterion is useful when the visual object 60 being queried has different colors.

Figure 12:
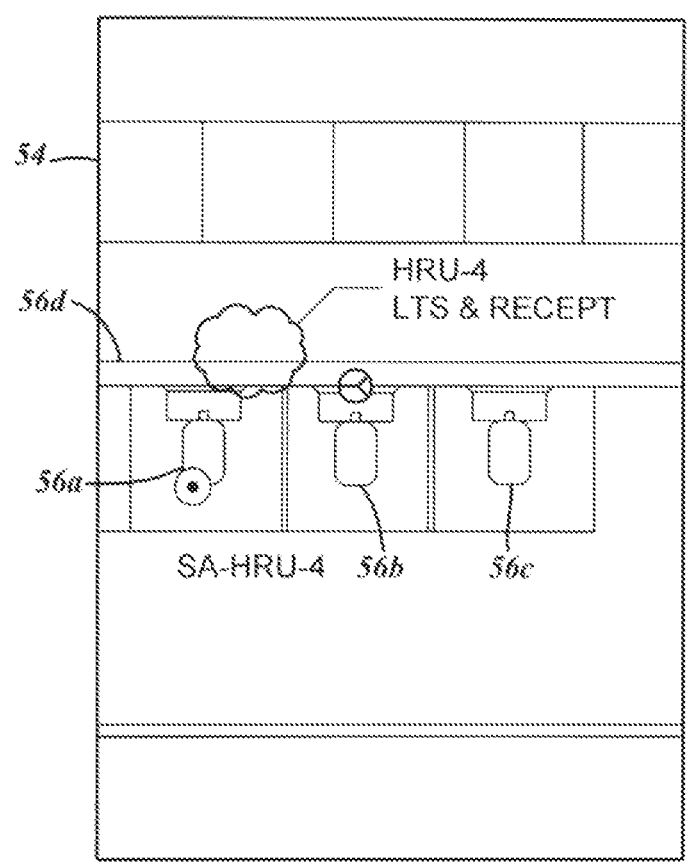
FIG. 12 shows a post-execution example of the pre-filtering method based on an ancillary raster component intersection flag.

The example shown in FIG. 12 illustrates the results of both the color and the size filters being deactivated and only being filtered based on the ancillary raster component intersection flag 118. The document 54 is the same as that shown in FIG. 2, as is the template visual object 90. Since there is no overlaid bitmap data on the template visual object 90, the corresponding ancillary raster component intersection flag 118 of the derived feature set 106 is not set. The obstructive third annotation 58c therefore does not appear in the pre-filtered document raster image 126.

Figure 13:
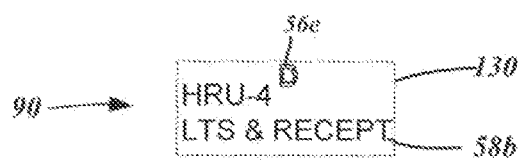
FIG. 13 shows another selection area from the document defining the template visual object for demonstrating a vector space color selection feature.

Still referring to the document 54 of FIG. 3, in some cases as with a second selection area 130 there are multiple visual objects 60 of similar sizes such as the second annotation 58b and a graphic element 56e. In this example, the second annotation 58b may have a different color than the graphic element 56e, e.g., the second annotation 58b may be colored black while the graphic element 56e is colored pink. According to various embodiments of the present disclosure, it is possible to refine the selection of colors in the color list 110 of the feature set 106, and further limit the visual objects 60 that are and are not pre-filtered. As shown in FIG. 13, upon making the inputting the selection area 130, it is set as the template visual object 90 per the previously described steps. Thus, a combination of the graphic element 56e and the second annotation 58b may therefore define the template visual object 90, and it is expressly contemplated that one visual object 60 can be comprised of multiple ones.

Figure 14A:
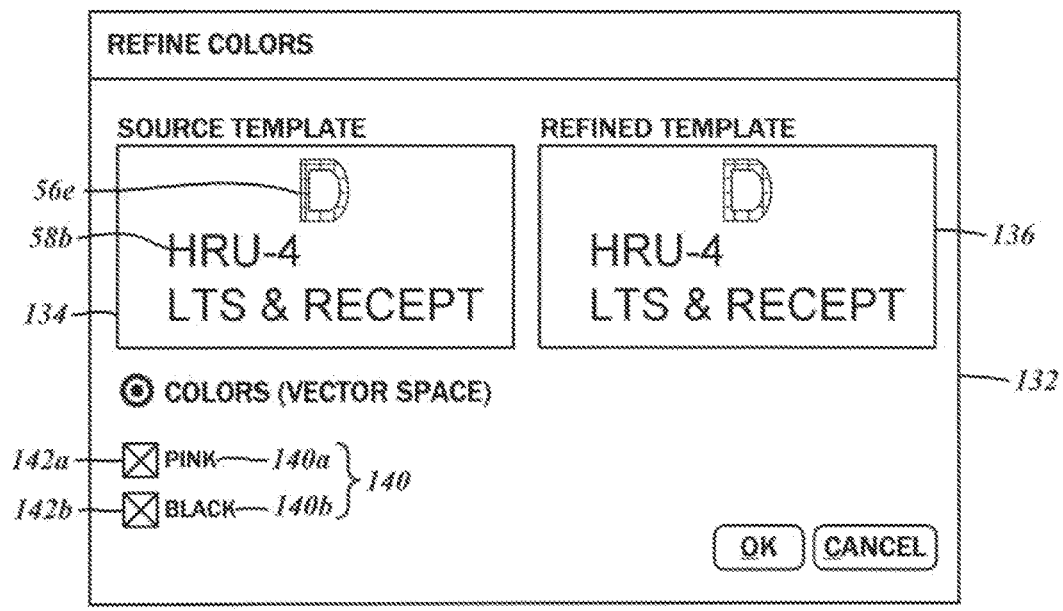
FIG. 14A-14C are various instance of a color selection dialog window with different colors of the template visual object being selected for pre-filtering.

Next, a refine colors button 132 in the tool panel window 62 is activated. With reference to Out example shown in FIG. 14A, this invokes a color selection dialog window 132, which is generally segregated into a source template section 134, a selection preview section 136, and a color selection input section 138. As suggested by its name, the source template section 134 displays the earlier designated template visual object 90 in its entirety and original color, including the graphic element 56e and the second annotation 58b. In the color selection input section 138, there is a listing 140 of each of the colors that are included in the template visual object 90, and is understood to correspond to the color list 110 of the feature set 106 derived from the template visual object 90. Continuing with the above example, the graphic element 56e is colored pink, so the listing 140 includes an entry 140a for pink. Furthermore, the second annotation 58b is colored black, so the listing 140 includes an entry 140*b* for black. Each entry includes a checkbox 142 that can be independently activated and deactivated.

Figure 14B:
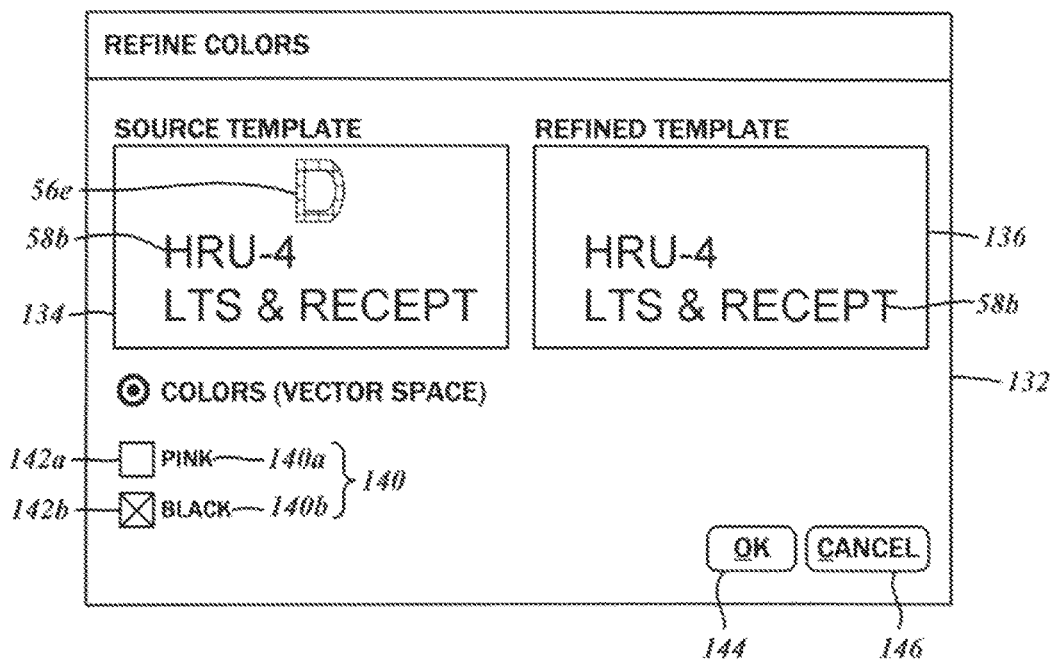

Referring now to the example of FIG. 14B, the second checkbox 142*b* corresponding to the second entry 140*b* is activated (meaning the color black is selected) while the first checkbox 142*b* corresponding to the first entry 140*a* is deactivated (meaning the color pink is not selected). As shown in the color selection preview section 136, the visual object with the deactivated color, i.e., the graphic element 56*e*, is removed, and only the second annotation 58*b* is displayed. Activating an OK button 144 applies this further refinement to the pre-filtering process, while activating a cancel button 146 discards the same and closes the color selection dialog window 132.

Figure 14C:
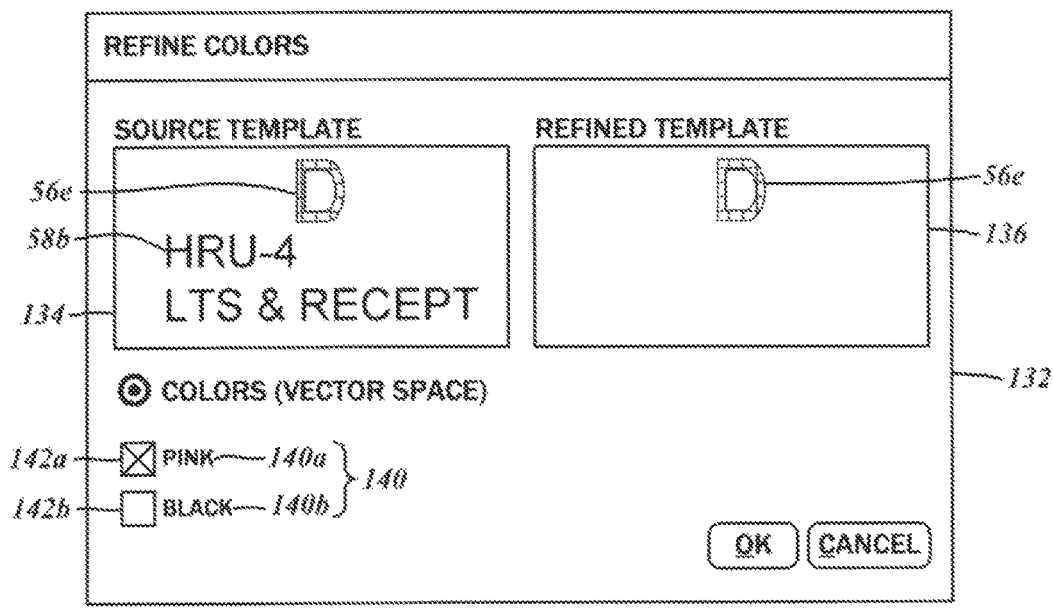

FIG. 14C illustrates an example case in which the first checkbox 142*a* corresponding to the first entry 140*a* is activated (meaning the pink color is selected) while the second checkbox 142*b* corresponding to the second entry 140*b* is deactivated (meaning the color black is not selected.) As shown in the color selection preview section 136, only the graphic element 56*e* with the color pink that is selected is shown, while the second annotation 58*b* that has the deselected color black is hidden.

Certain ones of the foregoing features involving vector graphics manipulation are understood to be particular to the first embodiment of the pre-filtering method. According to the second embodiment of the pre-filtering method, however, the document 54 and the various visual objects 60 thereon are represented as bitmaps, i.e., an array of pixels arranged in rows and columns. The documents 54, and specifically PDF files of this type may be produced as a result of scanning a physical paper document, or created from another raster image such as a JPEG (Joint Photographic Experts Group) standard file or any other bitmap format. The selection of the template visual object area 100, which corresponds to the contemplated step 400, was described in further detail above with reference to the flowchart of FIG. 4B.

Figure 15:
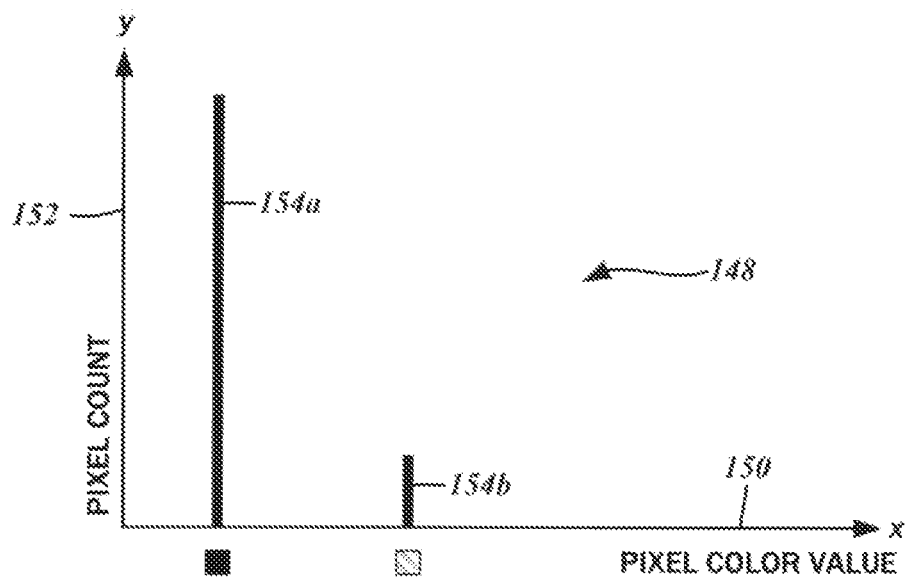
FIG. 15 is an example histogram plotting pixel color values and corresponding counts of the raster image shown in FIG. 7.

Continuing with the discussion of that second embodiment, and with additional reference to FIG. 15, the method proceeds to a step 402 of generating a histogram 148 that plots the frequency of each color value of the pixels within the bitmap. The example of FIG. 15 is understood to apply to the template visual object area 100 shown in FIG. 7, which includes first pixels 94*a* of a first color value, e.g., black, and second pixels 94*b* of a second color value, e.g., a shade intermediate of white and black. The x axis 150 of the histogram 148 plots the entire range of colors that the pixels 94 can be, and the y axis 152 plots the count or number of pixels within the bitmap. Generally, the histogram 148 is understood to graphically illustrate the most dominant color(s) of a raster image. The first pixels 94*a* (black), correspond to a first plot 154*a*, and the second pixels 94*b* (intermediate shade) correspond to a second plot 154*b*. Although only a simplified bitmap histogram have been presented, it will be recognized that raster image of any color depth and complexity may be utilized.

In accordance with some embodiments of the present disclosure, the template visual object area 100 may be first converted to grayscale prior to the step 402 of generating the histogram 148. In this regard, the aforementioned colors are understood to also refer to the grayscale levels or pixel intensity values of such a converted image. The term color and grayscale level is therefore referenced interchangeably.

Figure 16:
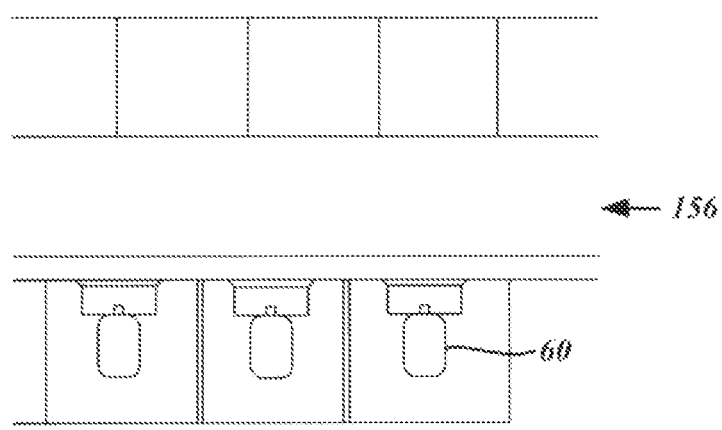
FIG. 16 is an example pre-filtered document raster image following an application of the second embodiment of the pre-filtering method.

Within a selected template visual object area 100, an assumption is made that pixel color values of the desired object or search operand will be predominant. That is, the peak vertical plot on the histogram 148 is understood to correspond to that of the desired object. Having derived this information, it is possible to remove all extraneous colors from the document 54 besides the one that corresponds to the peak vertical plot, or at least outside a predefined range thereof. This is understood to minimize the amount of irrelevant data that a subsequent visual search method must process. Referring back to the flowchart of FIG. 4B and the example of FIG. 16, the method continues with a step 404 of generating a pre-filtered document raster image 156. As with any such type of image, it may be comprised of pixel sets of one or more connected sequences of adjacent pixels. The remaining pixels in the pre-filtered document raster image 156 are understood to be those within a predefined range of a peak of the color value, i.e., those determined to be close to the color of the desired visual object. In the example shown, those visual objects 60 with the peak color value count e.g., black, are retained.

Figure 17:
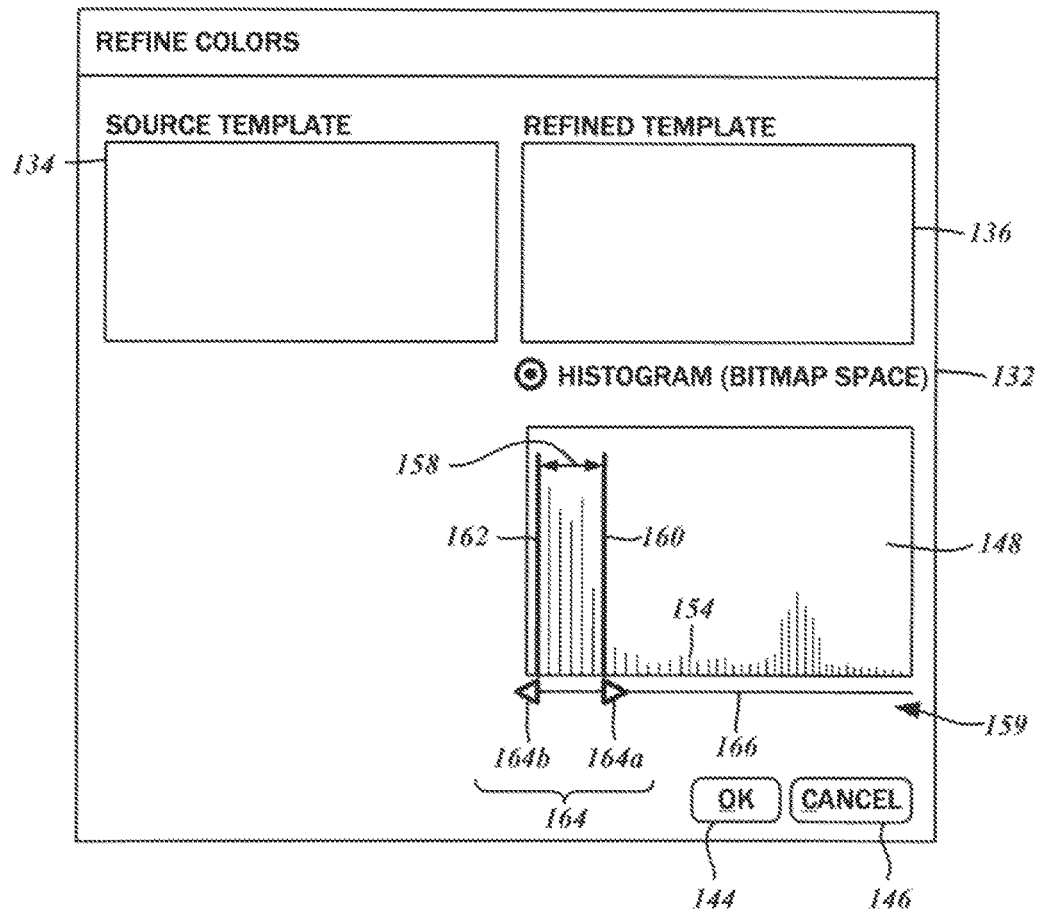
FIG. 17 is another instance of the color selection dialog window including a histogram manipulation interface.

With reference to a different embodiment of the color selection dialog window 132 shown in FIG. 17, it is envisioned that the pre-defined range 158 of color value peaks in the histogram 148 is adjustable via a histogram manipulation interface 159. There is a range maximum 160 as well as a range minimum 162, and each has a corresponding slider 164*a*, 164*b* that is movable along a horizontal, bar 166. The inputted range maximum 160 is understood to represent the highest along a continuum of colors that will be included in the pre-filtered document raster image 156, while the inputted range minimum is understood to represent the lowest along the continuum of colors included in the pre-filtered document raster image 156. Pixels that fall outside the range 158 of color values are understood to be discarded. Thus, using the sliders 164, more or fewer pixels of the raster image of the document 54 may be excluded from the pre-filtered document raster image 156. Preview results of these adjustments can be shown in the color selection preview section 136. After adjusting the sliders 164 to desired points, the OK button 144 may be activated to apply the corresponding rasterization parameters. Otherwise the cancel button 146 may be activated to close the color selection dialog window. The terms "highest" and "lowest" color values are only intended in the relative sense only, as color values along the axis of the histogram 148 may be ordered and arranged differently.

It is expressly contemplated that multiple local peaks and corresponding range of color values may be defined via the histogram manipulation interface 159. Further maximum and minimum sliders 164 may be added by, for example, clicking on a different portion of the histogram 148 not within the existing range 158. As will be recognized, the same pre-filtering of the pixels with color values outside the additionally defined range may be discarded in the same manner discussed above.

Again, these steps are understood to prepare the document 54 for a raster image-based visual search. Thus, one of the objectives of the pre-filtering method is the conditioning of the raster image passed to the search component to those colors that, are in the template visual object area 100, that is, the operand of the visual search. To this end, it is also possible to apply the aforementioned dilation steps to the resultant pre-filtered document raster image 156.

The particulars shown herein are by way of example and for purposes of illustrative discussion of the embodiments of the present invention only and are presented in the cause of providing what is believed to be the most useful and readily understood description of the principles and conceptual aspects of the pre-filtering methods. In this regard, no attempt is made to show mom details than is necessary for a fundamental understanding of the disclosure, the description taken with the drawings making apparent to those skilled In the art how the several forms of the presently disclosed methods may be embodied in practice.

What is claimed is:

1. A method of multiple pass, component based computerized searching on pre-filtered visual objects on a document, the method comprising:
    receiving a selection of a template visual object from a subsection of the document, the template visual object defined by one or more object components;
    deriving a feature set of the template visual object, the feature set including one or more of a color list of colors defining the object components, a bounding definition of the object components, or an ancillary raster component intersection flag;
    identifying visual objects on the document that are matching candidates for the template visual object based upon a predefined criteria relating to one or more of the color list, the bounding definition, or the ancillary raster component intersection flag of the feature set, the identified visual objects being a member of a subset of pre-filtered visual objects narrower than an entirety of the visual objects on the document; and
    generating from the document a pre-filtered document raster image including pixel sets of one or more connected sequences of adjacent pixels, the pixel sets corresponding to the subset of the pre-filtered visual objects;
    generating in a first pass a broad match candidate subset of visual objects on the document based upon a first comparison of dominant features of an entirety of the template visual object to dominant features of the pre-filtered document raster image; and
    generating in a second pass a narrowed match candidate subset of visual objects on the document from the broad match candidate subset based upon a second comparison of subsections of the one or more object components of the template visual object to subsections of object components of the visual objects in the broad match candidate subset.

2. The method of claim 1, further comprising:
    generating from the template visual object a template raster image including a template pixel set of one or more connected sequences of adjacent pixels;
    wherein the feature set is derived from the template raster image.

3. The method of claim 2, further comprising:
    dilating the pixels of the template raster image and the pre-filtered document raster image.

4. The method of claim 1, wherein the pixel sets corresponding to visual objects not in the subset of the pre-filtered visual objects are removed from the pre-filtered document raster image.

5. The method of claim 1, wherein one of the predefined criteria is the visual object having a color value corresponding to one of the colors in the color list of the feature set.

6. The method of claim 5, further comprising:
    receiving a selection of one of the colors in the color list;
    wherein the predefined criteria is the visual object having a color value corresponding to the selected one of the colors in the color list.

7. The method of claim 1, wherein one of the predefined criteria is the visual object having a length less than or equal to the bounding definition of the feature set.

8. The method of claim 7, wherein the bounding definition is a maximum one of a length and a height of the corresponding object component.

9. The method of claim 7, wherein the bounding definition is multiplied by a rotation allowance factor.

10. The method of claim 1, wherein one of the predefined criteria is the visual object including a raster component in which the visual object is evaluated to set the ancillary raster component intersection flag.

11. The method of claim 1 further comprising:
    generating a plurality of rotated template visual objects at different angular offsets from the template visual object.

12. The method of claim 1, further comprising:
    dilating the pixels of the template raster image and the pre-filtered document raster image.

13. A method of multiple pass, component based computerized searching on pre-filtered visual objects on a document, the method comprising:
    receiving a selection of a template visual object area from a subsection of the document, the template visual object area defined by one or more sequences of connected pixels each having a color value;
    generating a histogram of the color value from each of the pixels within the template visual object area;
    identifying pixel sets of one or more connected sequences of adjacent pixels in which the pixels thereof are within a predefined range of a peak of the color value, the identified pixel sets being part of a pre-filtered document raster image;
    generating in a first pass a broad match candidate subset of visual objects on the document based upon a first comparison of dominant features of an entirety of the template visual object to dominant features of the pre-filtered document raster image; and
    generating in a second pass a narrowed match candidate subset of visual objects on the document from the broad match candidate subset based upon a second comparison of subsections of the one or more object components of the template visual object to subsections of object components of the visual objects in the broad match candidate subset.

14. The method of claim 13, further comprising:
    converting the template visual object area and the document into grayscale, each of the color values being translated to intensity values.

15. The method of claim 13, further comprising:
    receiving an input re-defining the predefined range of the peak of the color value.

16. The method of claim 13, further comprising:
    dilating the pixels of the template visual object area and the pre-filtered document raster image.

17. A method of multiple pass, component based computerized searching on pre-filtered visual objects on a document, the method comprising:
    receiving a selection of a template visual object from a subsection of the document, the template visual object defined by one or more object components;
    deriving a feature set of the template visual object, the feature set including an color list of colors defining the object components;
    identifying visual objects on the document that are matching candidates of the template visual object based upon a predefined criteria relating to the color list, the identified visual objects being a member of a subset of pre-filtered visual objects;

generating from the document a pre-filtered document raster image including pixel sets of one or more connected sequences of adjacent pixels, the pixel sets corresponding to the subset of the pre-filtered visual objects;

generating in a first pass a broad match candidate subset of visual objects on the document based upon a first comparison of dominant features of an entirety of the template visual object to dominant features of the pre-filtered document raster image; and generating in a second pass a narrowed match candidate subset of visual objects on the document from the broad match candidate subset based upon a second comparison of subsections of the one or more object components of the template visual object to subsections of object components of the visual objects in the broad match candidate subset.

18. A method of multiple pass, component based computerized searching on pre-filtered visual objects on a document, the method comprising:

receiving selection or a template visual object from a subsection of the document, the template visual object defined by one or more object components;

deriving a feature set of the template visual object, the feature set including a bounding definition of the object components;

identifying visual objects on the document that are matching candidates of the template visual object based upon a predefined criteria relating to the bounding definition, the identified visual objects being a member of a subset of pre-filtered visual objects;

generating from the document a pre-filtered document raster image including pixel sets of one or more connected sequences of adjacent pixels, the pixel sets corresponding to the subset of the pre-filtered visual objects;

generating in a first pass a broad match candidate subset of visual objects on the document based upon a first comparison of dominant features of an entirety of the template visual object to dominant features of the pre-filtered document raster image; and generating in a second pass a narrowed match candidate subset of visual objects on the document from the broad match candidate subset based upon a second comparison of subsections of the one or more object components of the template visual object to subsections of object components of the visual objects in the broad match candidate subset.

19. A method of multiple pass, component based computerized searching on pre-filtered visual objects on a document, the method comprising:

receiving a selection of a template visual object from a subsection of the document, the template visual object defined by one or more object components;

deriving a feature set of the template visual object, the feature set including an ancillary raster component intersection flag;

identifying visual objects on the document that are matching candidates of the template visual object based upon a predefined criteria relating to the ancillary raster component intersection flag of the feature set, the identified visual objects being a member of a subset of pre-filtered visual objects;

generating from the document a pre-filtered document raster image including pixel sets of one or more connected sequences of adjacent pixels, the pixel sets corresponding to the subset of the pre-filtered visual objects;

generating in a first pass a broad match candidate subset of visual objects on the document based upon a first comparison of dominant features of an entirety of the template visual object to dominant features of the pre-filtered document raster image; and generating in a second pass a narrowed match candidate subset of visual objects on the document from the broad match candidate subset based upon a second comparison of subsections of the one or more object components of the template visual object to subsections of object components of the visual objects in the broad match candidate subset.

20. An article of manufacture comprising a non-transitory program storage medium readable by a data processing apparatus, the medium tangibly embodying one or more programs of instructions executable by the data processing apparatus to perform a method of multi-pass, component based computerized searching on pre-filtered visual objects on a document, the method comprising:

receiving a selection of a template visual object from a subsection of the document, the template visual object defined by one or more object components;

deriving a feature set of the template visual object, the feature set including at least one or more of a color list of colors defining the object components, a bounding definition of the object components, or an ancillary raster component intersection flag;

identifying visual objects on the document that are matching candidates of the template visual object based upon a predefined criteria relating to at least one or more of the color list, the bounding definition, or the ancillary raster component intersection flag of the feature set, the identified visual objects being a member of a subset of pre-filtered visual objects narrower than an entirety of the visual objects on the document;

generating from the document a pre-filtered document raster image including pixel sets of one or more connected sequences of adjacent pixels, the pixel sets corresponding to the subset of the pre-filtered visual objects;

generating in a first pass a broad match candidate subset of visual objects on the document based upon a first comparison of dominant features of an entirety of the template visual object to dominant features of the pre-filtered document raster image; and generating in a second pass a narrowed match candidate subset of visual objects on the document from the broad match candidate subset based upon a second comparison of subsections of the one or more object components of the template visual object to subsections of object components of the visual objects in the broad match candidate subset.

* * * * *